(12) United States Patent
Otaki et al.

(10) Patent No.: US 6,437,023 B1
(45) Date of Patent: *Aug. 20, 2002

(54) LIQUID PRESSURE TRANSFER INK, LIQUID PRESSURE TRANSFER FILM, LIQUID PRESSURE TRANSFER PRODUCT AND LIQUID PRESSURE TRANSFER METHOD

(75) Inventors: Nobuyuki Otaki; Kazuhiro Yamamoto; Misao Sugiyama, all of Shimizu (JP)

(73) Assignee: Cubic Co., Ltd., Shizuoka-Ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/194,216
(22) PCT Filed: Feb. 24, 1998
(86) PCT No.: PCT/JP98/00731
§ 371 (c)(1),
(2), (4) Date: Nov. 20, 1998
(87) PCT Pub. No.: WO98/46684
PCT Pub. Date: Oct. 22, 1998

(30) Foreign Application Priority Data

Nov. 4, 1997 (JP) .............................. 9-093308

(51) Int. Cl.[7] .......................... C09D 11/10; C08L 1/14; B41M 3/12
(52) U.S. Cl. .................... 523/161; 523/160; 524/39; 428/914
(58) Field of Search ................. 523/160, 161; 106/31, 69; 524/39; 428/914; 427/149

(56) References Cited

U.S. PATENT DOCUMENTS 4,010,057 A    3/1977  Nakanishi ................. 156/384
4,269,650 A  * 5/1981  Arai et al. ................. 156/540
4,436,571 A    3/1984  Nakanishi ................. 156/384
5,429,841 A  * 7/1995  Batlaw et al. ............. 427/288
5,908,525 A  * 6/1999  Zaher ....................... 156/230
5,925,452 A  * 7/1999  Niwa et al. ............. 428/308.4
5,972,088 A  * 10/1999 Krishnan et al. ......... 106/31.73

FOREIGN PATENT DOCUMENTS

JP    6466232   * 3/1989
JP    4-197699    7/1992
JP    8-238897    9/1996

OTHER PUBLICATIONS

Leach, R.H. and Pierce, R.J.; The Printing Ink Manual, Blueprint, London (pp. 481 and 490), 1993.*

* cited by examiner

Primary Examiner—Vasu Jagannathan
Assistant Examiner—Callie E. Shosho
(74) Attorney, Agent, or Firm—Pearne & Gordon LLP

(57) ABSTRACT

A pattern transferring film having a print pattern provided on an upper surface thereof is floated on a liquid surface within a transferring bath and an objective body to which a pattern is to be transferred is immersed into a liquid within the transferring bath together with the pattern transferring film under a liquid pressure so as to transfer the print pattern onto the objective body. A liquid pressure pattern-transferring printing ink comprises a resin ingredient having an alkyd resin as a fundamental component, a plasticizer and a pigment. The resin ingredient is composed of a short-oil alkyd resin of 2 to 15 weight % having a cellulose acetate butyrate of 3 to 20 weight % added thereto. The plasticizer for the printing ink is used which has a content of 2 to 4 weight % when the ink is of black and having a content of 0.01 to 2 weight % when the ink is of color other than black. The pattern transferring film is fed onto the liquid surface within the transferring bath so as to transfer the print pattern onto the objective body after the print pattern is treated by an activator to be swelled when being made dry, but as it is when it is in a state of being swelled immediately after printed.

7 Claims, No Drawings

LIQUID PRESSURE TRANSFER INK, LIQUID PRESSURE TRANSFER FILM, LIQUID PRESSURE TRANSFER PRODUCT AND LIQUID PRESSURE TRANSFER METHOD

DESCRIPTION

A liquid pressure pattern-transferring ink, a liquid pressure pattern-transferring film, a liquid pressure pattern-transferred article and a method of transferring a print pattern on an objective body under a liquid pressure

TECHNICAL FIELD

This invention pertains to a liquid pressure pattern-transferring ink including an alkyd resin as a fundamental ingredient used for transferring and printing appropriate print patterns such as wood grain patterns, marble patterns or other patterns by using a liquid pressure on an objective article (a body to which the print pattern is to be transferred) having a three-dimensional surface such as a curved surface or the like. Furthermore, this invention pertains to a pattern-transferring film having a print pattern printed thereon by the liquid pressure pattern-transferring ink, a liquid pressure pattern-transferred article having a predetermined print pattern transferred from the pattern-transferring film by using a liquid pressure and a method of transferring a print pattern on the objective article by using the pattern-transferring film.

TECHNICAL BACKGROUND

A method of transferring onto an objective body or article (a body to which a print pattern is to be transferred) by using a liquid pressure a print pattern on a pattern-transferring film floated on a liquid surface has been used for printing the print pattern on the objective body having a three-dimensional surface such as a curved surface and so on. The liquid to be used may be typically water and may be a liquid other than the water if it has no trouble for the liquid pressure pattern-transferring operation.

This liquid pressure pattern-transferring method is one in which a liquid-soluble or liquid-swelling pattern-transferring film having a predetermined print pattern of no liquid solution provided thereon is floated on a surface of a liquid flowing within a transferring bath and is made swelled by the liquid and then the objective body is immersed into the liquid within the transferring bath in a manner faced to the pattern-transferring film and has the print pattern transferred from the pattern-transferring film by using a liquid pressure.

The print pattern has a design provided as a collective form of dots on the pattern-transferring film by a gravure printing method. If the print pattern thus provided on the pattern-transferring film is in a dry state, then it is required to restore an adhesive property necessary for the pattern-transferring operation by returning from the dry state to an activated state by using an activator composite before it is transferred on the objective body.

In this case, the print pattern is required to have such an extensibility as allows the print pattern to be closely adhered to the objective body along the surface thereof. If a part of the ink of the print pattern is too much dissolved, the design pattern transferred and formed on the objective body tends to be destroyed. Reversely if a part of the printing ink is insufficiently dissolved, the print pattern will be transferred while a lump of ink remains. If the whole ink is excessively dissolved, then an arrangement of ink dots will be broken so that the transferred design pattern will be made blurred. Thus, such phenomena have to be prevented. In the description, the two former phenomena will be referred to as "a disarrangement of the transferred pattern" while the last phenomenon will be referred to as "a blur of the transferred pattern".

In general, the liquid pressure pattern-transferring ink comprises a resin ingredient serving as a binder of ink and being to become a print coat base layer, a pigment to take charge of color of the ink and a plasticizer to adjust a hardness of the resin when the ink is swelled or dried.

In a liquid pressure pattern-transferring ink of the prior art including an alkyd resin as a fundamental component, the resin ingredient is composed of a short-oil alkyd resin of 2 to 15 weight % having a nitrocellulose of 3 to 20 weight % added thereto, the plasticizer is composed of a dibutyl phthalate of 2 to 7 weight % or the like and the liquid pressure pattern-transferring ink comprises a color pigment of 5 to 40 weight % and a solvent of the remaining weight % in addition to the aforementioned ingredients.

The nitrocellulose serves to adjust a hardness of the resin ingredient so as to increase its hardness, but since the hardness of the resin in itself is relatively high, the print pattern disadvantageously fails to be transferred while it is smoothly extended due to a shortage of the extensibility of the ink. With the print pattern being fully not extended, it cannot be closely adhered to the objective body along the surface thereof, which causes the portion of the print pattern to be not adhered thereto so that a pinhole or pinholes are formed therein.

As aforementioned, the dry ink which forms the print pattern provided on the pattern-transferring film retrieves its adhesive property by being dissolved by an activator. The present applicant has proposed an activator composite having a fundamental ingredient of alkyd resin suitably used for dissolving the dry ink on the pattern-transferring film having the print pattern printed thereon by the printing ink having a fundamental ingredient of alkyd (see JP8-238897 or Japanese Patent Application Laying Open No. 238,897/1996). This activator composite comprises a resin ingredient having an alkyd resin as a fundamental component, a solvent and a plasticizer and the resin ingredient is composed of a short-oil alkyd resin having a cellulose acetate butyrate (cellulose acetobutyrate) added thereto.

The cellulose acetate butyrate in this activator composite is softer than the nitrocellulose which is one of the ingredients of the aforementioned ink, but harder than the short-oil alkyd resin which is another resin ingredient of the ink and serves to activate the dry ink so as to provide to the ink a full softness enough to extend the print pattern on the pattern-transferring film following a surface of fine roughness of the objective body while maintaining a hardness of certain degree and an apparent dryness of the alkyd resin even though the ink in itself is short of extensibility. In addition thereto, the cellulose acetate butyrate of the activator composite has a lower hygroscopicity and therefore serves to prevent a coated film of the print pattern transferred onto the objective body from being floated off or removed out of the surface of the objective body due to bubbles because of no absorption of water by the printing ink. Thus, the activator composite including the cellulose acetate butyrate can reduce the disarrangement of the transferred pattern due to the partial dissolution of the ink or the shortage of the dissolution of the ink when the dry ink is treated by the activator and also can reduce the floating off of the coated film due to bubbles. As noted from the foregoing, this activator composite can suitably activate the print pattern on the pattern-transferring film.

However, even though such an activator is used, a plain transferred pattern cannot be sometimes obtained because the disarrangement of the print pattern due to the partial dissolution of the printing ink or the shortage of dissolution of the printing ink cannot be fully prevented and also because there occurs the phenomenon of the transferred pattern being blurred due to the original state of the ink dots broken by the excessive dissolution of the printing ink. Especially, the excessive dissolution of the printing ink occurs when too much amount of the activator composite is coated and is caused to lose a sharpness (clearness) of the pattern transferred to the objective body. Thus, it will be noted that the amount of the activator composite to be coated should not be excessive in view of the sharpness of the transferred pattern.

The activator essentially serves to swell the dry printing ink and restore the adhesive property thereof. Thus, it is difficult to prevent the disarrangement of the transferred pattern due to the partial dissolution of the ink or the shortage of dissolution of the ink and the blurring of the transferred pattern due to the excessive dissolution of the ink only by an improvement on the activator. This has to be solved by improving the property of the ink in itself.

Accordingly, it is an object of the invention to provide a liquid pressure pattern-transferring ink adapted to effectively prevent a disarrangement or blurring of a transferred pattern by improving a hardness and a stickiness of the ink having a resin ingredient including an alkyd resin as a fundamental component and also adapted to maintain an extensibility of the ink.

It is another object of the invention to provide a pattern-transferring film having a print pattern adapted to effectively prevent a disarrangement or blurring of a transferred pattern by improving a hardness and a stickiness of the ink having a resin ingredient including an alkyd resin as a fundamental component and also adapted to maintain an extensibility of the ink.

It is further object of the invention to provide a liquid pressure pattern-transferred article having a transferred pattern adapted to effectively prevent a disarrangement or blurring of the transferred pattern by improving a hardness and a stickiness of the ink having a resin ingredient including an alkyd resin as a fundamental component and also adapted to be closely adhered onto the article.

It is further object of the invention to provide a method of transferring a print pattern on an objective body wherein a disarrangement or blurring of a transferred pattern can be effectively prevented by improving a hardness and a stickiness of the ink having a resin ingredient including an alkyd resin as a fundamental component and also the print pattern can be effectively closely adhered onto the objective body.

DISCLOSURE OF THE INVENTION

A first feature of the invention is to provide a liquid pressure pattern-transferring ink comprising a resin ingredient including an alkyd resin as a fundamental component, a plasticizer and a pigment, said resin ingredient being composed of a short-oil alkyd resin of 2 to 15 weight % having a cellulose acetate butyrate of 3 to 20 weight % added thereto, said plasticizer having a content of 2 to 4 weight % when the ink is of black and having a content of 0.01 to 2 weight % when the ink is of color other than black.

A second feature of the invention is to provide a liquid pressure pattern-transferring film having a liquid soluble or liquid swelling base film and a print pattern printed on said base film, said print pattern being formed by being printed by using a liquid pressure pattern-transferring ink comprising a resin ingredient including an alkyd resin as a fundamental component, a plasticizer and a pigment, said resin ingredient being composed of a short-oil alkyd resin of 2 to 15 weight % having a cellulose acetate butyrate of 3 to 20 weight % added thereto, said plasticizer having a content of 2 to 4 weight % when the ink is of black and having a content of 0.01 to 2 weight % when the ink is of color other than black.

A third feature of the invention is to provide a liquid pressure pattern-transferred article formed by transferring a print pattern from a pattern-transferring film to an objective body by using a liquid pressure, said print pattern being formed by being printed by using a liquid pressure pattern-transferring ink comprising a resin ingredient including an alkyd resin as a fundamental component, a plasticizer and a pigment, said resin ingredient being composed of a short-oil alkyd resin of 2 to 15 weight % having a cellulose acetate butyrate of 3 to 20 weight % added thereto, said plasticizer having a content of 2 to 4 weight % when the ink is of black and having a content of 0.01 to 2 weight % when the ink is of color other than black.

A fourth feature of the invention is to provide a method of transferring a print pattern from a pattern-transferring film to an objective body by using a liquid pressure, said print pattern being formed by being printed by using a liquid pressure pattern-transferring ink comprising a resin ingredient including as an alkyd resin as a fundamental component, a plasticizer and a pigment, said resin ingredient being composed of a short-oil alkyd resin of 2 to 15 weight % having a cellulose acetate butyrate of 3 to 20 weight % added thereto, said plasticizer having a content of 2 to 4 weight % when the ink is of black and having a content of 0.01 to 2 weight % when the ink is of color other than black and said print pattern which is made dry on said pattern-transferring film being transferred under said liquid pressure after said print pattern is so treated as to be activated by an activator.

A fifth feature of the invention is to provide a method of transferring a print pattern from a pattern-transferring film to an objective body by using a liquid pressure, said print pattern being formed by being printed by using a liquid pressure pattern-transferring ink comprising a resin ingredient including an alkyd resin as a fundamental component, a plasticizer and a pigment, said resin ingredient being composed of a short-oil alkyd resin of 2 to 15 weight % having a cellulose acetate butyrate of 3 to 20 weight % added thereto, said plasticizer having a content of 2 to 4 weight % when the ink is of black and having a content of 0.01 to 2 weight % when the ink is of color other than black and said print pattern being transferred under said liquid pressure before said print pattern is made dry on said pattern-transferring film.

The liquid pressure pattern-transferring or printing ink used for the invention is different from a prior art pattern-transferring ink because the former includes a cellulose acetate butyrate (cellulose acetobutyrate) substituted for a nitrocellulose in a resin ingredient of the prior art liquid pressure pattern-transferring ink.

The cellulose acetate butyrate is harder than the short-oil alkyd resin, but softer than the nitrocellulose. Thus, as the cellulose acetate butyrate is substituted for the nitrocellulose in the resin ingredient of the pattern-transferring ink, the resin ingredient of the ink in itself is made softer, which improves an extensibility of the print pattern on an objective body (a body to which the print pattern is to be transferred) with the result that the disarrangement of the transferred pattern due to the shortage of dissolution of the ink or the partial dissolution of the ink can be prevented.

However, if the amount of the cellulose acetate butyrate to be added is the same as that of the nitrocellulose used in the prior art ink, then there cannot be prevented the blurring of the transferred pattern due to the excessive dissolution of the ink when treated by an activator, which is caused by the ink composite being too soft.

With the content of the plasticizer in the printing ink being of 2 to 4 weight % in case of the black ink and being of 0.01 to 2 weight % in case of the ink of color other than black and with the amount of the plasticizer to be added being less than that of the printing ink including an alkyd resin as a fundamental component, the softness of the ink can be adjusted so that the hardness of the ink can be properly controlled not only when the ink is swelled, but also when it is dry. This serves to prevent the excessive dissolution of the ink so as to improve a sharpness of the transferred pattern.

As noted from the aforementioned features of the liquid pressure pattern-transferring ink of invention, a fundamental principle of the invention is to prevent a shortage of dissolution of the ink and a partial dissolution of the ink while maintaining an extensibility of the printing ink by lowering the hardness of the resin ingredient of the ink in itself and also to prevent an excessive dissolution of the ink after treated by the activator by lowering the content of the plasticizer having a function of adjusting a hardness of the printing ink so as to control the hardness of the entire ink.

The content of the plasticizer is as high as 2 to 4 weight % in case of the black ink and as much lower as 0.01 to 2 weight % in case of the ink of color other than black because the extensibility of the ink including the black pigment is lower than that of the one including the other pigment. If the content of the plasticizer in the black ink is too lower, then the print pattern is more badly extended after it is treated by the activator, which causes the print pattern to be kept from being transferred along the objective body having a complicated rough surface. Thus, the aforementioned contents of the plasticizer in case of the black ink and the other ink can prevent such a bad condition. It will be noted that the black ink has the same amount of the plasticizer to be added as that of the prior art ink in a lower range thereof.

BEST MODE FOR EMBODYING THE INVENTION

A fundamental method of transferring a print pattern by using a liquid pressure pattern-transferring ink of the invention is substantially identical to the prior art method as illustrated and described in U.S. Pat. Nos. 4,010,057 and 4,436,571, but a brief description of the method as described in the U.S. Pat. No. 4,436,571 herein just below.

A pattern-transferring film used for the liquid pressure pattern transferring method can be produced by printing a print pattern such as wood grain pattern or marble pattern on a liquid soluble or liquid swelling base film of polyvinyl alcohol resin by a gravure printing method or other method using the printing ink of the invention. This pattern-transferring film is stored as a pattern-transferring film supply by being wound into a roll or making a bundle of sheet after dried.

In case the print pattern on the pattern-transferring film is transferred onto an objective body, a series of pattern-transferring film or every sheet of pattern-transferring film is supplied from the pattern-transferring film supply before it is supplied into a transferring bath and passes through a coating means such as a roll coater where it is treated by an activator which coats an activator onto the print pattern on the pattern-transferring film.

The activator used for the treatment serves to restore the printing ink from the dry state to the swelling state so that the print pattern has a state of adhesive property as if it is just after it is printed. In case the objective body has a primer coat, the activator preferably includes such a component as never rapidly dissolves a layer of the primer coat and has an affinity with a solvent of the primer coat. Such an activator may be suitably an activator composite as described in the aforementioned JP8-238897.

The pattern-transferring film having the print pattern thus treated by the activator is supplied onto a liquid surface within the transferring bath by a suitable film supplying means while the print pattern is upwardly faced. The base film of the pattern-transferring film is swelled and softened by a liquid within the transferring bath which may be typically water. Meanwhile, the print pattern on the pattern-transferring film is restored to the state of being fully swelled so as to be able to be transferred because it is treated by the activator before it reaches a transferring area within the transferring bath.

A conveying means serves to convey the objective body so as to partially or entirely immerse it into the liquid together with the transferring film while engaging the transferring film which is located at the transferring area within the transferring bath. Thus, the print pattern is transferred and closely adhered to a surface of the objective body under a liquid pressure which occurs when the objective body is immersed into the liquid. The print pattern can be closely adhered to and along the curved or complicated rough surface of the objective body in accordance with the extensibility of the ink.

The conveying means to convey the objective body withdraws up the objective body onto which the print pattern is attached out of the liquid surface and then conveys the pattern transferred body to a surface treatment room. Within the surface treatment room is showered a hot water onto the pattern transferred body to wash out the remaining portion of the base film of the transferring film. Thereafter, within the surface treatment room is blown a hot air onto the pattern transferred body so that the solvent included in the ink and the activator is evaporated. An over coat may be provided onto the pattern transferred body, if necessary.

As described in the U.S. Pat. No. 4,010,057 specification, the pattern transferring film may be used for transferring the print pattern under a liquid pressure by being supplied to the transferring bath before being made dry after the print pattern is printed. In this case, treating the transferring film by the activator is not required.

The objective body should be conveyed in such a pose that an air never enters between the objective body and the transferring film when it is immersed into the liquid within the transferring bath. The liquid within the transferring bath has a flow of given velocity so that the pattern-transferring film is moved to the transferring area at the given velocity and the objective body is immersed into the liquid at the velocity corresponding to that of the transferring film.

A fundamental principle of the pattern-transferring ink of the invention is to prevent a shortage of dissolution of the ink and a partial dissolution of the ink after treatment by the activator without damaging the extensibility of the ink by lowering the hardness of the resin ingredient in itself in the printing ink and also to prevent an excessive dissolution of the ink or an excessive flow of the ink in the swelling state after treated by the activator by lowering the content of the plasticizer having a function of adjusting a hardness of the printing ink so as to control the hardness of the entire ink.

In order to accomplish the aforementioned fundamental principle, the liquid pressure pattern-transferring ink comprises a resin ingredient including an alkyd resin as a fundamental component, a plasticizer and a pigment, but the resin ingredient is composed of a short-oil alkyd resin of 2 to 15 weight % having a cellulose acetate butyrate (celloluse acetobutyrate) of 3 to 20 weight % added thereto, the plasticizer has a content of 2 to 4 weight % when the ink is of black and has a content of 0.01 to 2 weight % when the ink is of color other than black. The plasticizer may be typically and suitably a dibutyl phthalate, but may be a plasticizer composite other than that.

Some examples of the specific ratio of ingredients of the liquid pressure pattern-transferring ink together with examples of the specific ratio of ingredients of the prior art transferring ink are shown in Table 1.

TABLE 1

| Ingredients | Ratio of ingredients (weight %) | |
| --- | --- | --- |
|  | Present invention | Prior art |
| Resin ingredients |  |  |
| short-oil alkyd resin | 2 to 15 |  |
| Nitro-cellulose | — | 3 to 20 |
| Cellulose acetate butyrate | 3 to 20 | — |
| Plasticizer (Butyl phthalate) |  |  |
| (Black ink) | 2 to 4 | 4 to 7 |
| (Other ink) | 0.01 to 2 | 2 to 4 |
| Pigment |  | 5 to 40 |
| Solvent |  | residue |

The pigment may have metal powder pigment such as aluminum powder, pearl mica powder, brass powder or the like for having a unique ornamental effect provided to the ink. A toluene, a xylene, an ethyl acetate, an acetone or the like may be used as the solvent.

In the ratio of ingredients shown in the Table 1, the ratio of the short-oil alkyd resin is from 2 to 15 weight %, but relatively smaller amount of the short-oil alkyd resin may be used when a large amount of color pigment is used while relatively larger amount of the short-oil alkyd resin may be used when the color of the color pigment is thin so that a concentration of the printing ink can be adjusted thereby. The ratio of either the nitrocellulose or the cellulose acetate butyrate is from 3 to 20 weight %, but a relatively smaller amount of them may be used when the ink is required to be softer so as to adjust a stickness of the ink to a lower value as it is swelled while a larger amount of them may be used when the ink is required to be harder so as to adjust the stickness of the ink to a higher value as it is swelled whereby the hardness of the resin ingredients of the ink is adjusted. The ratio of the pigment is from 5 to 40 weight %, but set so as to cover a difference of the coloring property whereby the ink has the same coloring property.

These ratios of the ingredients are set within the aforementioned range in accordance with the conditions for liquid pressure pattern-transferring such as materials and sizes of the objective body and the velocity at which the pattern-transferring operation is made.

As noted from the aforementioned Table 1, the liquid pressure pattern-transferring ink has (1) a first feature of having a cellulose acetate butyrate substituted for a nitrocellulose of resin ingredients in the prior art pattern-transferring ink with the same ratio as that of the prior art nitrocellulose, and (2) a second feature of having a ratio of 0.01 to 4 weight % of the plasticizer which is less than that of the plasticizer in the prior art ink, but having a ratio of 2 to 4 weight % in case of the black ink and 0.01 to 2 weight % in case of the other ink. The printing ink of the invention is distinguished over the prior art printing ink in view of the two features of the invention.

In the first feature of the invention, the cellulose acetate butyrate (cellulose acetobutyrate) used therefor is a mixed ester which is obtained by adding a nitric acid and an acetic acid to a cellulose, which is harder than the short-oil alkyd resin, but softer than nitrocellulose and has a hygroscopic property lower than the nitrocellulose has. Since the short-oil alkyd resin is a nondrying resin, the cellulose acetate butyrate serves to avoid dust from being attached to the nondrying alkyd resin by lowering a stickness of the alkyd resin so as to make it as if it is apparently dry and also serves to provide to the too soft alkyd resin such a hardness as the ink is never partially dissolved. Furthermore, since the cellulose acetate butyrate which is softer than the nitrocellulose is substituted for the latter which is harder, it can make the best use of the softness of the short-oil alkyd resin. This can effectively prevent the transferred pattern from being disarranged, which is caused by the disorder of the ink due to the partial dissolution of the ink or by the remaining lump of the ink due to the shortage of dissolution of the ink and also can effectively prevent a pinhole or pinholes due to an insufficiently close adhesion of the pattern to the objective body while maintaining the extensibility of the ink in accordance with the softness of the short-oil alkyd resin even though the amount of the activator to be used is made lower in order to improve the sharpness of the transferred pattern.

In the second feature of the invention, the content of the plasticizer in the ink of the invention is lower than that in the prior art ink because this prevents the transferred pattern from being blurred by the disorder of the ink dots from a predetermined state thereof when printed which is in turn caused by an excessive dissolution of the entire ink and by the excessively higher fluidity when swelled and also prevents the transferred pattern from being made lighter by the excessive extension of the ink, both of which are caused by the entirely lower hardness of the resin ingredients.

Since a black color pigment is of inorganic one such as a carbon black, the content of the plasticizer should be as high as 2 to 4 weight % in case of the black ink, but it should be as low as 0.01 to 2 weight % in case of the ink of other than black.

Various samples (liquid pressure pattern transferred articles) were obtained by transferring a wood grain pattern on pattern-transferring films onto the objective bodies which were of various ABS resins and had various roughnesses made on the surfaces thereof by sand papers, in which the pattern-transferring films were formed by printing the wood grain pattern on the base film of polyvinyl alcohol resin by using the particular inks of examples of the invention and the prior art by a multi-color gravure printing method and were coated with various amounts of an activator.

There were made tests for confirming whether was formed or how many pinholes were formed in the transferred patterns on the samples and cylinder tests for confirming a property of adhesion of the inks around cylinders from the pattern-transferring films formed by using the inks identical to those used for the samples. What is meant by "cylinder test" is one in which a curvature printing is made onto a surface of each of cylindrical test pieces along their longitudinal direction by the liquid pressure pattern-transferring method so as to confirm how well the ink is adhered to the test pieces around the surfaces thereof. According to the tests, a property of the inks can be determined from variation in the design pattern (how well the ink is adhered) because, with the objective bodies being cylindrical, the design pattern is deformed by being given substantial stress of deformation when transferred to the objective bodies and the degree and scale of the stress of deformation vary on the property of the inks.

The printing inks of the invention and of the prior art used in these examples had the following particular ratios of ingredients shown in Table 2.

TABLE 2

| Ingredients of ink | Examples of the Invention (Weight %) | Prior Art (weight %) |
| --- | --- | --- |
| Short-oil alkyd resin | 3 | 3 |
| Nitrocellulose | — | 12 |
| Cellulose acetate butyrate | 12 | |
| Butyl phthalate | | |
| (Black ink) | 2 | 4 |
| (Other ink) | 1 | 3 |
| Pigment | 5–40 | 5–40 |
| Solvent | residue | residue |

The activator used in these rests was of such particular ratio of ingredients as disclosed in JP8-238,897 (Japanese Patent Application Laying-Open No. 238,897/1996) which had the composition shown in Table 3.

TABLE 3

| Ingredients of Activator | Weight % |
| --- | --- |
| Short-oil alkyd resin | 20 |
| Cellulose acetate butyrate | 1 |
| Butyl cellosolve (solvent) | 30 |
| Butylcarbitol acetate (solvent) | 80 |
| Dibutyl phthalate (plasticizer) | 30 |

In Table 4 are shown the results of the tests for confirming whether a pinhole was produced or how many or large pinholes were produced with respect to the samples obtained by the printing inks of the examples of the invention and the prior art, respectively and the results of the cylinder tests performed with respect to the pattern-transferring films identical to those used for these samples. In the Table 4, variations in the amount of the activator to be coated are indicated by the counts of the coating gravure rolls and the degrees of the rough surfaces of the objective bodies which are to be samples are indicated by the counts of the sand-papers. Furthermore, a symbol of "X" indicates that there were pinholes of unallowable number or scale in the print pattern on the surfaces of the samples while a symbol of "○" indicates that there were neither pinhole nor pinholes of unallowable number or scale therein. The two down or lower figures of the counts of the gravure rolls indicate a depth ($\mu$m) of gravures or grooves in the gravure rolls and the figures in the parentheses of the counts indicate the amount (g/m$^2$) of the activator to be coated. It should be noted that the deeper gravures in the peripheral surfaces of the gravure rolls imply that a larger amount of the activator was coated while the smaller figures of the counts of the sandpapers imply that they were rougher with the result that the surfaces of the objective bodies got rougher.

"Yes" in the Table 4 indicates that the state of adhesion of the ink around the test pieces in the cylinder tests was practically of problem while "No" indicates that it was practically of no problem.

TABLE 4

| Inks used for transferring films | Prior art | Example | Prior art | Example |
| --- | --- | --- | --- | --- |
| Gravure rolls for coating activator | #100-35 (7 g/m$^2$) | | #100-45 (10 g/m$^2$) | |
| Sand-paper (counts) for forming rough surface of the base body | | | | |
| 600 | X | X | X | X |
| 800 | X | ○ | ○ | ○ |
| 1000 | X | ○ | ○ | ○ |
| 1200 | X | ○ | ○ | ○ |
| 1500 | ○ | ○ | ○ | ○ |
| Cylinder test | Yes | No | No | No |

As noted from the Table 4, as the surface of the objective body which was to be a sample was treated by the sand paper of count No. 600 so as to make it substantially rougher, there occur an unallowable number of pinholes in case of both of the example of the invention and the prior art, but as printing was made onto the objective body which was treated by the sand paper of more than count No. 800 which was less rough, there occurs no pinhole or no unallowable pinholes except for the sample using the prior art printing ink having a smaller amount of activator to be coated.

More particularly, it will be noted that if the activator to be coated is of larger amount so as to fully dissolve both of the ink according to the example of the invention and the ink of the prior art, then there does not occurs any or unallowable pinhole even though the surface of the objective body is slightly rough, but if the activator to be coated is of a smaller amount so as to insufficiently dissolve the ink of the prior art, then there occur unallowable pinholes even though the surface of the objective body is not so rough. This is caused by the ink of the prior art being not able to follow the rough surface of the objective body because of a poor extensibility of the prior art ink which is harder than the ink of the invention. On the other hand, since the ink of each of the examples of the invention has an extensibility and therefore can follow the objective body so as to be closely adhered thereto even though it has a relatively rougher surface, there tends to occur no pinhole or no unallowable ones.

If the amount of the activator to be coated on the prior art ink is larger, then a pinhole or unallowable pinholes can be prevented, but if a larger amount of the activator is coated, then the pattern of the product is blurred so as to get unclear which will be described later with reference to Table 5. Thus, it will be noted that the ink according to the examples of the invention is more excellent because it effectively follows the rough surface of the objective body even though a smaller amount of activator is used and therefore produces no unallowable pinhole therein.

As noted from the result of the cylinder test, if the amount of the activator to be coated is larger, then both of the inks of the prior art and the example of the invention have an excellent adhesive property thereof to the test pieces, but it is confirmed that if the amount of the activator to be coated is smaller, then the ink of the prior art has a poor adhesive property to the test piece. It will be noted that since the amount of the activator to be coated should be smaller in order to obtain the sharpness of the design pattern, the ink of the examples of the invention is more excellent than that of the prior art.

Table 5 shows the results of the test confirming the sharpness of the design patterns obtained by changing the amount of the activator to be coated with respect to the samples of the examples of the invention and the prior art. In this Table, the two down or lower figures of the counts of the gravure rolls indicate a depth ($\mu$m) of gravures or grooves in the gravure rolls similarly and it should be noted that the deeper gravures in the peripheral surfaces of the gravure rolls imply that a larger amount of the activator is coated.

The figures of the results of the test in the Table 5 are ones obtained by estimating the sharpness of the transferred pattern on the liquid pressure pattern-transferred article relative to the sharpness of the transferred pattern on the liquid pressure pattern-transferred article which is obtained by coating the activator on the ink of the prior art with the gravure rolls of #100-45 (the depth of the roll grooves 45 mm) used, which sharpness is visually estimated as 5 point. The larger the figures become, the transferred pattern is sharper, which implies that the good result is obtained.

TABLE 5

| Inks used for transferring films | Gravure rolls | | |
| --- | --- | --- | --- |
| | #100-35 | #100-45 | #100-60 |
| Ink of prior art | — | 5 | 4.5 |
| Ink of Example of invention | 8 | 7.5 | — |

As noted from the Table 5, it is in case the activator is coated by the gravure rolls of more than #100-45 that the design pattern can have the allowable sharpness obtained by using the prior art ink. It is confirmed that if the activator is coated on the prior art ink by the gravure rolls of less than #100-35 which implies that a smaller amount of the activator is coated, then there occurs a disarrangement of the transferred pattern due to the shortage of dissolution of the ink or the partial dissolution of the ink, but no sharpness of the transferred pattern. This is caused by the hardness of the ink of the prior art in itself. Reversely, if the activator is coated on the prior art ink by the gravure rolls of #100-60 by which the larger amount of the activator is coated, then the sharpness of the transferred pattern on the sample falls down into "4.5".

On the other hand, if the ink of the example of the invention has the activator coated by the gravure roll of #100-35 which coats the smallest amount of the activator, the transferred pattern on the sample has the much better sharpness of "8" and if the ink of the example of the invention has the activator coated by the gravure rolls of #100-45 which coats the larger amount of the activator, the transferred pattern on the sample has the slightly worse sharpness of "7.5", but it will be noted that it is much more excellent than the sharpness of "5" of the transferred pattern on the sample according to the prior art which is obtained in case of the same amount of the activator coated. This is based on the fact that the ink of the example of the invention has such a proper hardness and stickness as there occurs neither of the shortage of dissolution of the ink in itself, the partial dissolution thereof and the excessive dissolution thereof.

The aforementioned Tables 4 and 5 show only three tests made by using the ink having the ratio of ingredients shown in Table 2 and the activator having the ratio of ingredients shown in Table 3 with respect to both of the prior art and the examples of the invention, but it is confirmed that the same results could be obtained in the same tests made by using various inks of the invention having the ratio of ingredients falling within the range shown in the Table 1.

Next, how the coat layer of the ink according to the examples of the invention and that of the ink according to the prior art varied as time lapsed was confirmed by a release test which was made by a cross-cut adhesion tape method which will be described hereinafter. First, a coat layer sample formed by the ink according to the examples of the invention and a coat layer sample formed by the ink according to the prior art were left for 500 hours under a high temperature and high humidity atmosphere having a room temperature of 50° C. and having a relative humidity of 98% so as to enhance an absorption of moisture into the coat layer samples. Thereafter, a plurality of cuts were formed in these coat layer samples by a cutter at a distance of 1 mm, cellophane tapes were adhered onto the cuts and then were peeled off therefrom.

In this test, when the cellophane tapes were peeled off from the samples, the coat layer formed of the ink according to the prior art was partially peeled off, but the coat layer formed of the ink of the examples of the invention was never peeled off. This is caused by the coat layer of the ink according to the prior art absorbing a moisture in the atmosphere because of the prior art ink having a higher hygroscopicity, which moisture was stored and moved upwardly as bubbles so that the coat layer tended to be easily peeled off, but by the coat layer formed of the ink according to the examples of the invention having no moisture stored therein because of the ink of the invention having a lower higroscopicity of the cellulose acetate butyrate, which kept the coat layer from being peeled off.

The liquid pressure pattern transferring ink according to the invention may be applied for transferring the print pattern onto objective bodies of various materials other than the objective body of ABS resin. For instance, the objective bodies may be ones formed of organic or inorganic materials including mold goods formed of a thermoplastic or thermosetting resin such as acrylic resin, ABS resin, vinyl chloride resin, polystyrene resin, noryl resin, phenol resin, urea resin, melamine resin and epoxy resin in the form of a simple substance or FRP or formed of metal, wood, stone or other suitable materials.

The activator serving to swell the dry ink on the pattern transferring film may be coated onto the pattern-transferring film immediately after the transferring film is floated onto the liquid surface or after the base film of the transferring film is swelled by the liquid (water) within the transferring bath as well as before it is floated on the liquid surface. The activator to be coated before the transferring film is floated on the liquid surface may be coated by a roll coater having gravure rolls used therein while the activator to be coated after the transferring film is floated on the liquid surface may be coated by a spray coater.

As described and illustrated in the U.S. Pat. No. 4,010,057 specification which was previously cited, the liquid pressure pattern-transferring ink of the invention may be applied for a technique in which the pattern-transferring film is fed to the transferring bath and the print pattern is transferred from the transferring film onto the objective body after the transferring film is formed by printing the print pattern on the base film thereof and before the ink is made dry. In this case, since the print pattern on the transferring film is in a state of being swelled, the activator is not required to be coated onto the transferring film. Nevertheless, it is confirmed that the ink of the transferring film in the state of being swelled has a proper hardness while maintaining a good extensibility in the same manner as the ink of the transferring film in the state of being treated by the activator after being dry and that there can be obtained an excellent transferred pattern never losing the sharpness, having no unallowable pinhole made due to be insufficiently closely adhered to the objective body and being never deteriorated due to the absorption of moisture in addition to having no disarrangement of the transferred pattern.

UTILIZABILITY OF INDUSTRIES

In this manner, the invention is suitably applied for decorating various articles having a complicated rough surface including not only small-sized articles such as various articles of daily use, various sporting and gymnastic equipments, casings for various office automation instruments, equipments provided within a car and so on, but alos large-sized articles such as panels for a car and so on.

What is claimed is:

1. A liquid pressure pattern-transferring ink consisting of a short-oil alkyd resin, cellulose acetate butyrate, a plasticizer and a pigment, said short-oil alkyd resin having a weight content of 2 to 15%, said cellulose acetate butyrate having a weight content of 3 to 20%, said plasticizer having a weight content of 2 to 4% when the ink is black and a weight content of 0.01 to 2% when the ink is of a color other than black, said cellulose acetate butyrate increasing the dissolution of said ink in printing solvents and thereby enhancing the extensibility and adhesion of the ink to a printed surface.

2. A liquid pressure pattern-transferring film having a liquid soluble or liquid swelling base film and a print pattern printed on said base film, said print pattern being formed by printing a liquid pressure pattern-transferring ink consisting of a short-oil alkyd resin, cellulose acetate butyrate, a plasticizer and a pigment, said short-oil alkyd resin having a weight content of 2 to 15%, said cellulose acetate-butyrate having a weight content of 3 to 20%, said plasticizer having a weight content of 2 to 4% when the ink is black and a weight content of 0.01 to 2% when the ink is of a color other than black, said cellulose acetate butyrate increasing the dissolution of said ink in printing solvents and thereby enhancing the extensibility and adhesion of the ink to a printed surface.

3. A liquid pressure pattern-transferred article formed by transferring a print pattern from a pattern-transferring film to an objective body by using a liquid pressure, said print pattern being formed by printing a liquid pressure pattern-transferring ink consisting of a short-oil alkyd resin, cellulose acetate butyrate, a plasticizer and a pigment, said short-oil alkyd resin having a weight content of 2 to 15%, said cellulose acetate butyrate having a weight content of 3 to 20%, said plasticizer having a weight content of 2 to 4% when the ink is black and a weight content of 0.01 to 2% when the ink is of a color other than black, said cellulose acetate butyrate increasing the dissolution of said ink in printing solvents and thereby enhancing the extensibility and adhesion of the ink to a printed surface.

4. A method of transferring a print pattern from a pattern-transferring film to an objective body by using a liquid pressure, comprising the steps of forming said print pattern on said pattern-transferring film using a liquid pressure pattern-transferring ink consisting of a short-oil alkyd resin, cellulose acetate butyrate, a plasticizer and a pigment, said short-oil alkyd resin having a weight content of 2 to 15%, said cellulose acetate butyrate having a weight content of 3 to 20%, said plasticizer having a weight content of 2 to 4% when the ink is black and a weight content of 0.01 to 2% when the ink is of a color other than black, said cellulose acetate butyrate increasing the dissolution of said ink in printing solvents and thereby enhancing the extensibility and adhesion of the ink to a printed surface, drying said print pattern on said pattern-transferring film, activating said dried print pattern with an activator and transferring said print pattern after it has been activated from said pattern-transferring film under said liquid pressure to said objective body.

5. A method of transferring a print pattern from a pattern-transferring film to an objective body by using a liquid pressure, comprising the steps of forming said print pattern by printing using a liquid pressure pattern-transferring ink consisting of a short-oil alkyd resin, cellulose acetate butyrate, a plasticizer and a pigment, said short-oil alkyd resin having a weight content of 2 to 15%, said cellulose acetate butyrate having a weight content of 3 to 20%, said plasticizer having a weight content of 2 to 4% when the ink is black and a weight content of 0.01 to 2% when the ink is of a color other than black, said cellulose acetate butyrate increasing the dissolution of said ink in printing solvents and thereby enhancing the extensibility and adhesion of the ink to a printed surface, and transferring said print pattern under said liquid pressure from said pattern-transferring film to said objective body.

6. A method as set forth in claim 5, wherein said cellulose acetate butyrate has a lower hygroscopicity than nitrocellulose and the step of selecting said resin includes reducing the tendency of dust to be attached to the ink by using said cellulose acetate butyrate as compared with using nitrocellulose in an otherwise identical resin ingredient.

7. A liquid pressure pattern transferring ink consisting of a short-oil alkyd resin, cellulose acetate butyrate, a plasticizer and a pigment, said short-oil alkyd resin having a weight content of 2 to 15%, said cellulose acetate butyrate having a weight content of 3 to 20%, said plasticizer having a weight content of 2 to 4% when the ink is black and a weight content of 0.01 to 2% when the ink is of a color other than black.

* * * * *

UNITED STATES PATENT AND TRADEMARK OFFICE
CERTIFICATE OF CORRECTION

PATENT NO.    : 6,437,023 B1
DATED         : August 20, 2002
INVENTOR(S)   : Nobuyuki Otaki et al.

It is certified that error appears in the above-identified patent and that said Letters Patent is hereby corrected as shown below:

<u>Title page,</u>
Item [30], Foreign Application Priority Data should be amended to read as follows:

-- April 11, 1997 (JP) .......................... 9-093308 --

Signed and Sealed this

Eleventh Day of March, 2003

JAMES E. ROGAN
*Director of the United States Patent and Trademark Office*